(12) United States Patent
De Benedittis

(10) Patent No.: US 8,776,847 B2
(45) Date of Patent: Jul. 15, 2014

(54) MECHANISMS FOR EJECTING OBJECTS FROM A TIRE TREAD

(75) Inventor: Eric A. De Benedittis, Greenville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 347 days.

(21) Appl. No.: 12/808,749

(22) PCT Filed: Dec. 21, 2007

(86) PCT No.: PCT/US2007/088486
§ 371 (c)(1),
(2), (4) Date: Jun. 17, 2010

(87) PCT Pub. No.: WO2009/082394
PCT Pub. Date: Jul. 2, 2009

(65) Prior Publication Data
US 2010/0258228 A1    Oct. 14, 2010

(51) Int. Cl.
*B60C 11/11* (2006.01)
*B60C 11/12* (2006.01)
*B60C 11/13* (2006.01)

(52) U.S. Cl.
USPC ............ 152/209.21; 152/DIG. 1; 152/DIG. 3

(58) Field of Classification Search
USPC ...... 152/209.21, DIG. 1, DIG. 3, 900, 209.18
See application file for complete search history.

(56) References Cited

U.S. PATENT DOCUMENTS

| | | | |
|---|---|---|---|
| 1,147,149 A | 7/1915 | Dunbar | |
| 2,121,955 A | 6/1936 | Eger | |
| 2,186,180 A | 1/1940 | Sloman et al. | |
| 2,661,041 A | 12/1953 | Walsh | |
| 2,850,066 A * | 9/1958 | Nellen | 152/209.21 |
| 3,825,052 A | 7/1974 | Matsuyama et al. | |
| 4,271,885 A * | 6/1981 | Takigawa et al. | 152/209.18 |
| 4,423,760 A | 1/1984 | Treves | |
| 4,705,088 A * | 11/1987 | Ghilardi | 152/209.18 |
| 4,955,415 A | 9/1990 | Takeuchi | |
| 5,012,847 A | 5/1991 | Fukumoto et al. | |
| 5,109,904 A * | 5/1992 | Numata et al. | 152/209.22 |

(Continued)

FOREIGN PATENT DOCUMENTS

| EP | 0227322 | * | 1/1987 |
|---|---|---|---|
| EP | 0242487 A1 | | 10/1987 |

(Continued)

OTHER PUBLICATIONS

International Search Report and Written Opinion for PCT/US2007/088488 dated Jun. 10, 2008.

*Primary Examiner* — Richard Crispino
*Assistant Examiner* — Robert Dye
(74) *Attorney, Agent, or Firm* — Hahn Loeser & Parks, LLP

(57) ABSTRACT

Apparatus for ejecting objects from a tire tread include, in particular embodiments, a pair of adjacent ground-engaging elements, each element including a ground-engaging contact surface; a groove separating the pair of ground-engaging elements, the groove having a base and a pair of opposing sidewalls spaced apart by a groove width; a sipe having a particular size, and located in communication with a portion of the groove extending between the pair of ground-engaging elements; and, an ejector associated with the sipe, the ejector comprising a projection that extends within the groove.

15 Claims, 7 Drawing Sheets

(56) References Cited

U.S. PATENT DOCUMENTS

| | | |
|---|---|---|
| 5,115,850 A | 5/1992 | Crump et al. |
| 5,154,216 A | 10/1992 | Ochiai et al. |
| 5,160,385 A | 11/1992 | Goto et al. |
| 5,246,049 A | 9/1993 | Ramcke et al. |
| 5,373,881 A | 12/1994 | Enoki |
| 5,385,189 A | 1/1995 | Aoki et al. |
| 5,417,269 A | 5/1995 | Kinoshita et al. |
| 5,492,161 A | 2/1996 | Fuchikami et al. |
| 5,549,146 A | 8/1996 | Trabandt et al. |
| 5,975,172 A | 11/1999 | Nakatsuji |
| 6,000,451 A | 12/1999 | Takada |
| 6,142,200 A | 11/2000 | Feider et al. |
| 6,170,544 B1 | 1/2001 | Hottebart |
| 6,176,284 B1 | 1/2001 | Takada |
| 6,253,815 B1 | 7/2001 | Kemp |
| 7,143,799 B2 | 12/2006 | Collette et al. |
| 7,182,113 B2 | 2/2007 | Saguchi |
| 7,208,110 B2 | 4/2007 | Lopez et al. |
| 7,225,844 B2 | 6/2007 | Lagnier |
| 7,273,081 B2 | 9/2007 | Miyake |
| 2007/0062626 A1 | 3/2007 | Oyama |
| 2008/0093000 A1 * | 4/2008 | Fujioka .................... 152/209.21 |

FOREIGN PATENT DOCUMENTS

| | | |
|---|---|---|
| EP | 0413502 A1 | 2/1991 |
| EP | 0510550 A1 | 10/1992 |
| EP | 0675011 A1 | 10/1995 |
| EP | 1810849 A1 | 7/2007 |
| GB | 2326386 A | 12/1998 |
| GB | 2326387 A | 12/1998 |
| JP | 60189608 A | 9/1985 |
| JP | 62061807 A | 3/1987 |
| JP | 62194908 A | 8/1987 |
| JP | 62286803 A | 12/1987 |
| JP | 62299406 A | 12/1987 |
| JP | 63297108 A | 12/1988 |
| JP | 01095910 A | 4/1989 |
| JP | 01153304 A | 6/1989 |
| JP | 01175508 A | 7/1989 |
| JP | 02048202 A | 2/1990 |
| JP | 02053617 A | 2/1990 |
| JP | 02127104 A | 5/1990 |
| JP | 03007603 A | 1/1991 |
| JP | 03007604 A | 1/1991 |
| JP | 03067706 A | 3/1991 |
| JP | 03125607 A | 5/1991 |
| JP | 03258602 A | 11/1991 |
| JP | 04278809 A | 10/1992 |
| JP | 05085110 A | 4/1993 |
| JP | 05096913 A | 4/1993 |
| JP | 05112107 A | 5/1993 |
| JP | 05112108 A | 5/1993 |
| JP | 05286419 A | 11/1993 |
| JP | 05294115 A | 11/1993 |
| JP | 05338414 A | 12/1993 |
| JP | 06001115 A | 1/1994 |
| JP | 06115318 A | 4/1994 |
| JP | 06183212 A | 7/1994 |
| JP | 06183217 A | 7/1994 |
| JP | 06183220 A | 7/1994 |
| JP | 06191230 A | 7/1994 |
| JP | 06239107 A | 8/1994 |
| JP | 06239108 A | 8/1994 |
| JP | 06320914 A | 11/1994 |
| JP | 06344727 A | 12/1994 |
| JP | 08156515 A | 6/1996 |
| JP | 08156519 A | 6/1996 |
| JP | 08183309 A | 7/1996 |
| JP | 09132010 A | 5/1997 |
| JP | 09240220 A | 9/1997 |
| JP | 10035224 A | 2/1998 |
| JP | 10076810 A | 3/1998 |
| JP | 10076813 A | 3/1998 |
| JP | 10086610 A | 4/1998 |
| JP | 10100616 A | 4/1998 |
| JP | 10151914 A | 6/1998 |
| JP | 11129707 A | 5/1999 |
| JP | 11180112 A | 7/1999 |
| JP | 11192818 A | 7/1999 |
| JP | 11254910 A | 9/1999 |
| JP | 2006-137231 | 6/2006 |
| JP | 2007-030547 | 2/2007 |
| JP | 2007-131217 | 5/2007 |

* cited by examiner

MECHANISMS FOR EJECTING OBJECTS FROM A TIRE TREAD

BACKGROUND OF THE INVENTION

1. Field of the Invention

This invention relates generally to tread patterns for tires, and more specifically, to tread patterns having mechanisms for ejecting stones and other objects from the tire tread.

2. Description of the Related Art

It is generally known that tires include a tread portion for engaging a ground surface. The tread portion may include a tread pattern for generating traction between the ground surface and the tire. Tread patterns may include circumferential grooves, lateral (transverse) grooves, and other types of voids, which may be used independently or conjunctively to form traction edges. Further, such voids may also absorb and/or displace water, snow, mud, sand, and the like to improve tire traction. However, such voids may also accept stones and other objects, which may become lodged within the tire tread. These objects may be detrimental to the performance and safety of a host tire, as the objects may reduce tire traction, and/or cause tire imbalance, wear, abrasions, and punctures.

Accordingly, when an object becomes lodged in a tire tread pattern, it may be difficult for the object to dislodge without further assistance. If known mechanisms cannot prevent objects from becoming lodged, it may be desirous to provide a mechanism that can dislodge objects without having to stop a vehicle to personally remove a lodged object. Such a mechanism may also be helpful when a vehicle operator is unaware of any object within the tread, which may give rise to a safety issue unbeknownst to the vehicle operator.

SUMMARY OF THE INVENTION

Particular embodiments of the present invention include an apparatus for ejecting objects from a tire tread portion. Particular embodiments of the present invention include a tire tread having a length extending in a longitudinal direction, a width extending in a lateral direction, and a depth extending in a vertical direction, the tire tread including: a pair of adjacent ground-engaging elements, each element including a ground-engaging contact surface; a groove separating the pair of ground-engaging elements, the groove having a base and a pair of opposing sidewalls spaced apart by a groove width; a sipe having a particular size, and located in communication with a portion of the groove extending between the pair of ground-engaging elements; and, an ejector associated with the sipe, the ejector comprising a projection that extends within the groove. In particular embodiments, the sipe is located along one of the sidewalls, the one of the sidewalls being opposite the sidewall containing the ejector. In particular embodiments, the sipe is located along an ejector.

Particular embodiments of the present invention may also include a tire tread having a length extending in a longitudinal direction, a width extending in a lateral direction, and a depth extending in a vertical direction, the tire tread comprising: a pair of adjacent ground-engaging elements, each element including a ground-engaging contact surface; a groove separating the pair of ground-engaging elements, the groove having a base and a pair of opposing sidewalls spaced apart by a groove width; an ejector comprising a projection extending within the groove from one of the groove sidewalls, and including a leading side, a trailing side, and a lateral side extending between the leading and trialing sides; and, a first sipe having a particular size and located in communication with the groove, wherein the first sipe is located adjacent either the leading side or the trailing side of the ejector, along the same sidewall containing the ejector. Particular embodiments may also provide the first sipe being located adjacent either the leading side or the trailing side of the ejector, along the same sidewall containing the ejector. Particular embodiments may also include a second sipe extending from the same sidewall as the ejector, the second sipe having a particular size and located in communication with the groove, wherein the first sipe is located adjacent to one of the leading or trailing sides of the ejector, and the second sipe is located adjacent to the other of the leading or trailing side of the ejector. Particular embodiments may also provide the first sipe being located adjacent the lateral side of the ejector, along a sidewall that opposes the sidewall containing the ejector.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention include apparatus for ejecting or dislodging objects from a tire tread portion. In such embodiments, tread portions or treads that include such ejecting apparatus may be attached to a tire, or may exist separately from a tire, such as when, for example, the tread is used to retread a tire.

Figure 1:
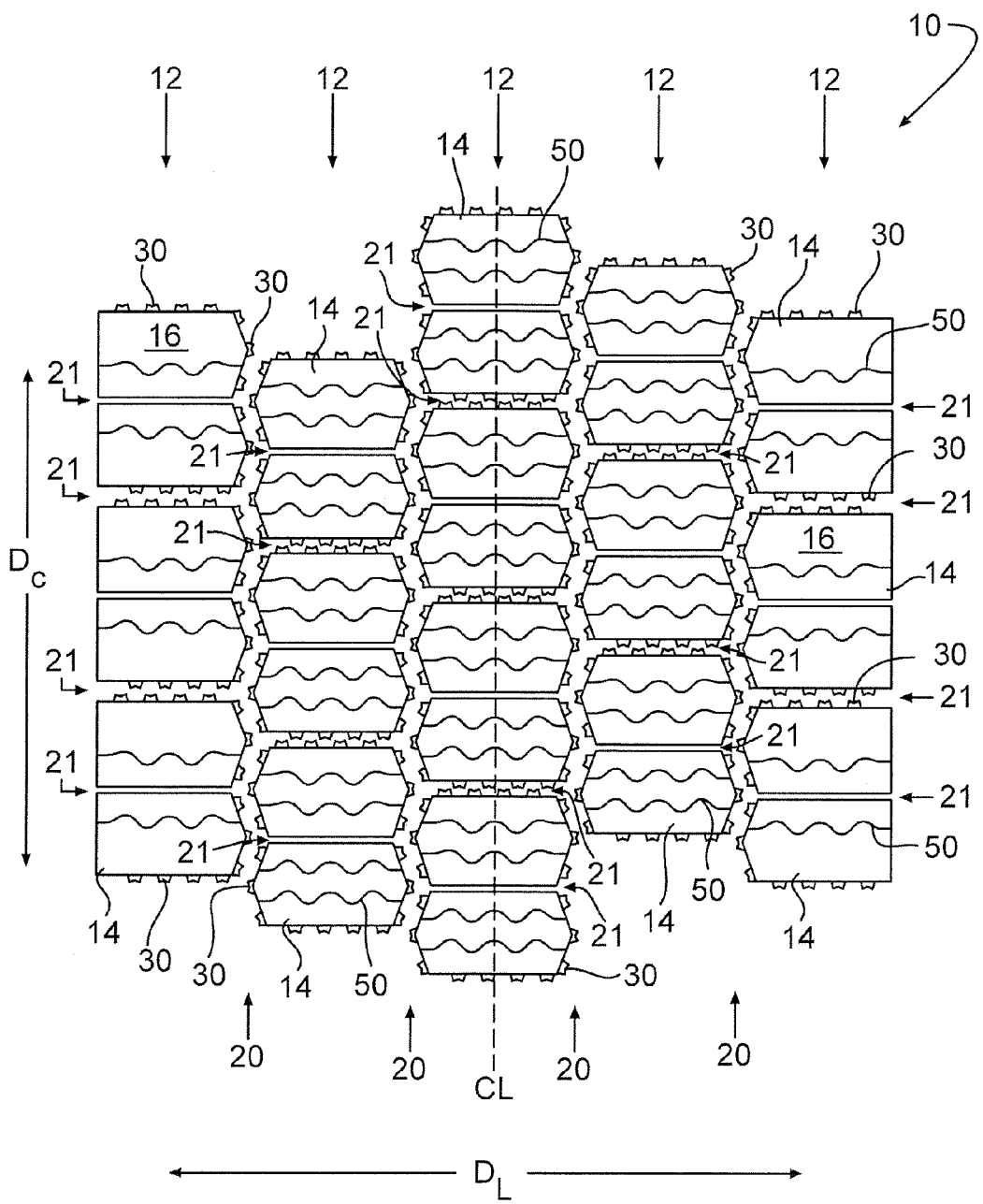
FIG. 1 is a top view of an exemplary tire tread pattern, according to an embodiment of the invention.

With reference to FIG. 1, tire tread portion 10 generally includes a length, a width, and a depth. The length extends in a longitudinal direction ($D_C$), which is also the circumferential direction of the tire when the tread is located on the tire. The tread width extends in a lateral direction ($D_L$) perpendicular to the tread centerline (CL), while the tread depth extends in a vertical direction. Exemplary embodiments of the tire tread portions and the object ejecting apparatus are described herein.

As shown exemplary in FIG. 1, tread portion 10 may include one or more ground-engaging elements, such as ribs 12 or lugs 14. Ground-engaging elements contact the ground within a tire footprint or contact patch. Each rib 12 generally extends about the circumference of a tire 10 in one or more directions, and is generally bounded by one or more longitudinal grooves 20. Each rib 12 may remain substantially continuous, or may comprise a plurality of lugs 14. Lugs 14 generally include a ground-engaging surface, and are generally defined by one or more longitudinal grooves 20 and one or more lateral grooves 21. It is contemplated that lugs 14 may exist without the existence of any rib 12, where each such lug 14 may be arbitrarily or randomly located along tread 10 so not to be arranged within a rib 12.

With continued reference to FIG. 1, an exemplary tread portion 10 includes one or more projections referred to herein as ejectors 30. An ejector 30 generally extends within a groove and may interact with a stone or other object that is lodged, or is otherwise located within, groove 20. Each groove 20, 21 generally includes opposing groove walls 22a, 22b and a groove bottom 24. Ejectors 30 may extend within a longitudinal groove 20 or a lateral groove 21, either from a groove sidewall 22 or a groove bottom 24.

Longitudinal groove 20 generally has a depth (i.e., height), and may extend in a particular path, which may be linear or non-linear. For example, the path may be linear, arcuate, or zig-zag, as exemplarily shown in FIG. 1. Further, groove 20 may extend along a path that ultimately extends around the circumference of a tire, or may extend a limited distance, such as between one or more ground-engaging tread elements, such as ribs 12 or lugs 14. Groove 20 may extend in a direction parallel to tread centerline (CL), or at any angle relative thereto. Grooves 20 generally have a width ($W_G$), such that opposing groove walls 22a, 22b do not collapse inwardly across width ($W_G$) to contact each other when traveling within a tire footprint. In particular embodiments, groove widths ($W_G$) may comprise between 2 and 20 millimeters (mm), while tread depths may extend between 20 and 24 mm. However, it is contemplated that larger and smaller groove widths ($W_G$) and depths may exist, as various tire sizes and designs may exist for various purposes. Contrary to grooves 20, sipes 50 are narrow slits or elongated voids that generally remain closed or collapse inwardly at least when traveling through a tire footprint. Grooves 20, 21 provide tread void for displacing water, snow, and the like from the footprint, while decreasing traction surface area. Sipes 50 provide little change in void, but provide other benefits, such as reducing tread stiffness and tread heat, and increasing traction by way of providing additional traction edges.

Figure 2:
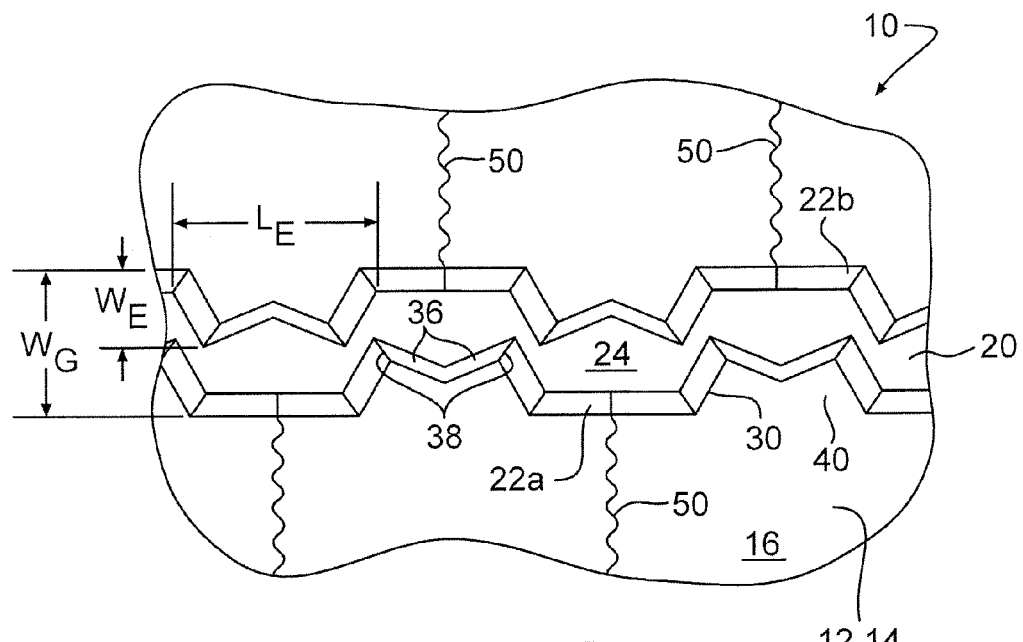
FIG. 2 is a top view of an exemplary tread pattern portion showing a particular sipe-ejector arrangement along a groove, in accordance with an embodiment of the invention.
Figure 3:
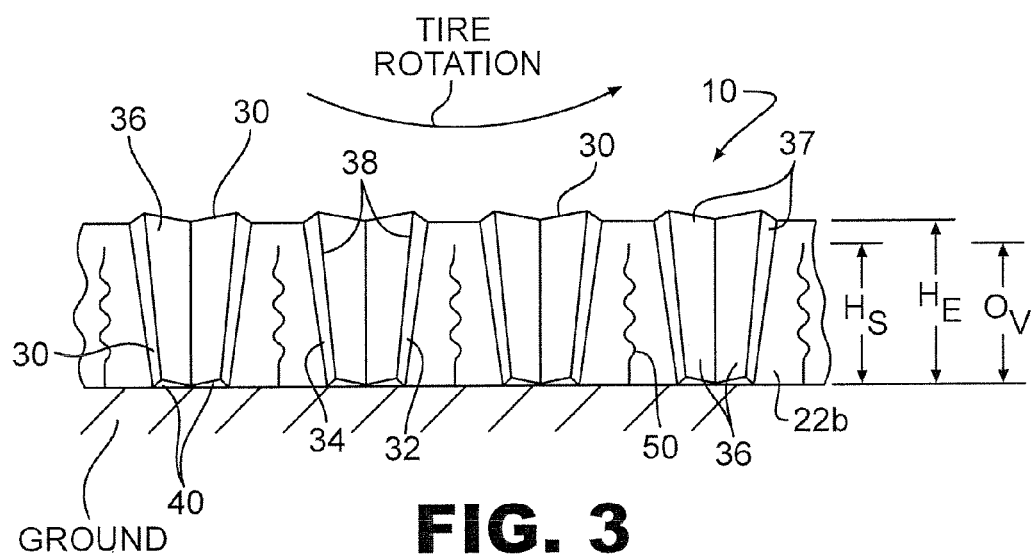
FIG. 3 is a side view of a groove sidewall of the exemplary tread pattern shown in FIG. 2.
Figure 4:
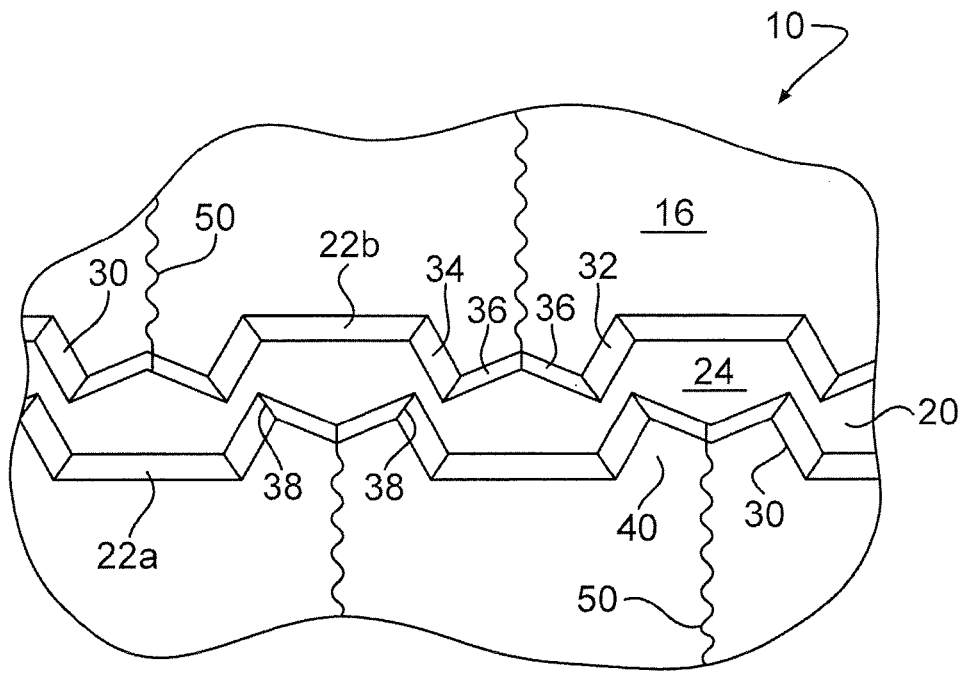
FIG. 4 is a top view of an exemplary tread pattern portion showing a particular sipe-ejector arrangement along a groove, in accordance with an embodiment of the invention.
Figure 5:
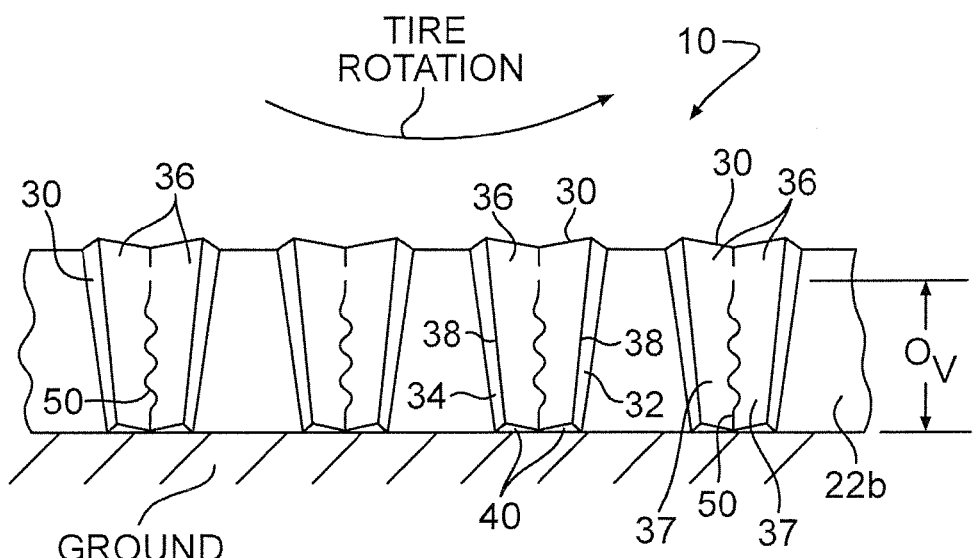
FIG. 5 is a side view of a groove sidewall of the exemplary tread pattern groove shown in FIG. 4.
Figure 14:
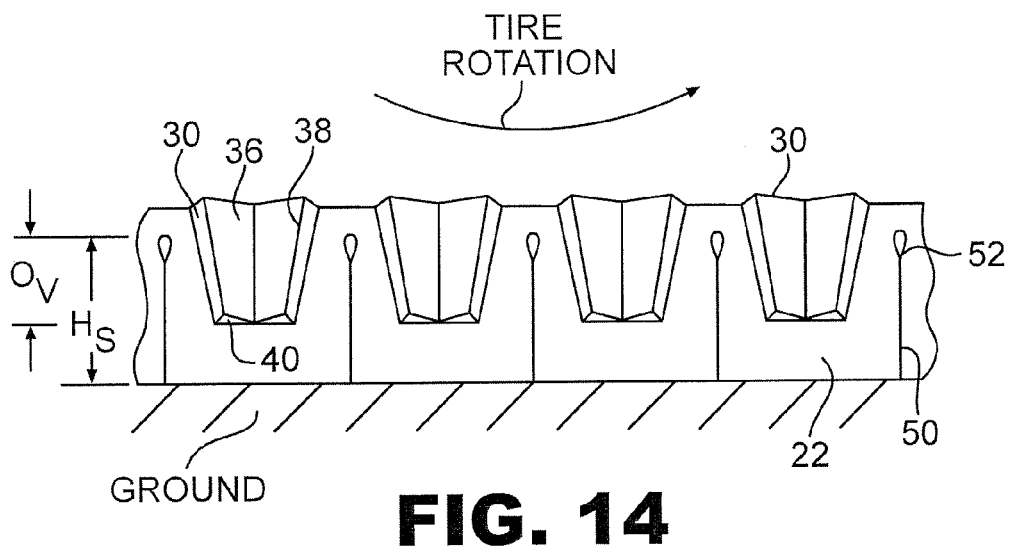
FIG. 14 is a side view of a groove sidewall of an exemplary tread pattern showing a particular sipe-ejector arrangement along a groove, in accordance with an embodiment of the invention.

As shown in FIGS. 1-5, sipes 50 may generally extend downward from a tread contact surface 16 of ribs 12 or lugs 14, and may vary in size and shape. For example, sipes 50 may extend through any depth of tread 10, to achieve a desired height ($H_s$). FIGS. 3 and 5 exemplarily show sipes 50 extending partially through the depth or height of a ground-engaging element. FIG. 14 exemplarily shows sipes 50 that fully extend through the depth or height of a ground-engaging element. Sipes 50 may also extend fully or partially across the width of any rib 12 or lug 14, and may travel in any direction relative to the tire lateral direction ($D_L$), which includes in particular embodiments extending substantially in the tire lateral direction ($D_L$) as exemplarily shown in FIG. 1. As each sipe 50 extends in any direction, each sipe 50 may follow any desired path, which includes any linear, arcuate, or zig-zag path. FIGS. 1, 2, and 4 exemplarily show sipes 50 extending in a laterally extending zig-zag path, while FIGS. 3 and 5 show sipes 50 extending in a downward zig-zag path. FIG. 14 shows a linear downward path. Sipes 50 may include a large void 52 located near or at an internal end of the sipe 50, such as is shown in an exemplary embodiment in FIG. 14. Void 52 may comprise any shape and size, and may be positioned or arranged in any relation to sipe 50. It is generally understood that any sipe design or construction known to one having ordinary skill in the art may be used in accordance with this invention.

With general reference to FIGS. 2-5, each ejector 30 has a leading side 32 and/or a trailing side 34, whether extending from a groove sidewall 22 or from a groove bottom 24, and is defined by a height ($H_E$), a width ($W_E$), and a length ($L_E$). The dimensional size of each ejector 30 may vary as each tire varies is size and purpose. In particular embodiments, an ejector 30 may have a width ($W_E$) that extends between 2 and 10 mm and a length ($L_E$) that extends between 5 and 60 mm. It is contemplated that an ejector 30 may extend any distance into a groove 20. In particular embodiments, the ejector 30 width ($W_E$) comprises up to approximately 50% of the groove width ($W_G$), although more is contemplated. In other embodiments, the ejector 30 width ($W_E$) comprises between 10% and 30% of the groove width ($W_G$).

An ejector 30 may also have one or more lateral sides 36 that face a groove sidewall 22. Any and all sides 32, 34, 36 of ejector 30 may extend in any direction. In particular embodiments, one or more sides of ejector 30 may be inclined relative to the groove bottom 24, as exemplarily shown in FIGS. 2-5, 9-13, which may generally provide an ejector 30 having a cross-section that narrows with increasing ejector height ($H_E$). These inclined sides may assist in ejecting objects by engagingly directing an object outwardly from groove 20.

With continued reference to FIGS. 2-5, particular embodiments of ejector 30 may include a lateral side 36 having one or more ridges 38, which may extend in any direction along, or relative to, lateral side 36. In particular embodiments, ridges 38 may extend any distance along a height of ejector 30, that is, in some radial (vertical) direction outward a groove 20, 21. It is also contemplated that ridges 38 may extend longitudinally or laterally along any side 32, 34, 36. With specific reference to FIG. 12, it is contemplated that each of the two separated forms shown may operate as a single ejector 30, or may be used individually to function as a single ridge ejector 30. A ridge 38 may assist in the ejection of an object by providing less surface area for engaging the object, which concentrates the forces transmitted by ejector 30 to better manipulate, twist, and force the object from groove 20.

Each ejector 30 generally includes one or more leading surfaces 37, each of which generally face the direction of tire rotation. With specific reference to FIGS. 3 and 5, exemplary embodiments of ejector 30 include leading surfaces 37 that are located on leading side 32 and along lateral side 36. Leading surfaces 37 may assist in ejecting objects, as the leading surfaces 37 may transmit ejecting forces against any contacting object, so to propel or push the object forward and/or out of the tread as the ejector 30 rotates out from the footprint.

Figure 15:
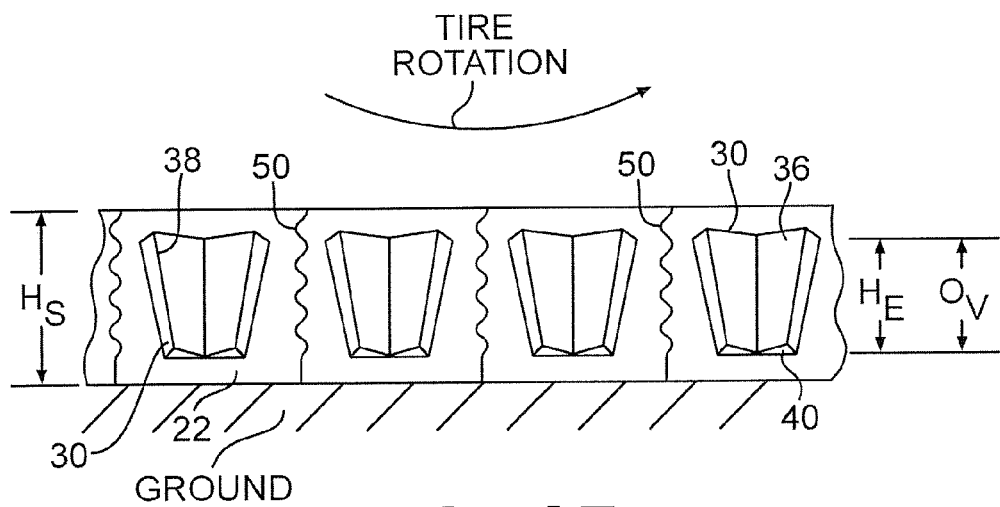
FIG. 15 is a side view of a groove sidewall of an exemplary tread pattern showing a particular sipe-ejector arrangement along a groove, in accordance with an embodiment of the invention.

Particular embodiments of ejector 30 may also include a top side 40 and/or a bottom side 41. Top side 40 may function to deter stones or other objects from entering any groove 20, 21. It is contemplated that ejector bottom side 41 may extend to the groove bottom 24, as exemplarily shown in FIGS. 2-5, or be located above, or offset, from the groove bottom 24, as exemplarily shown FIG. 15.

Figure 12:
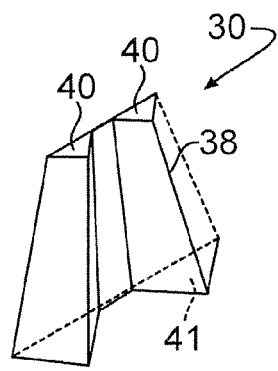
FIG. 12 is perspective view of an exemplary ejector, in accordance with an embodiment of the invention.
Figure 13:
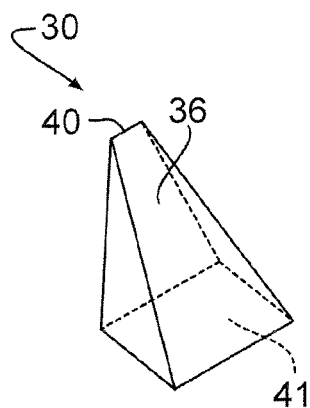
FIG. 13 is perspective view of an ejector, in accordance with an embodiment of the invention.

It is understood that ejectors 30 may comprise any desired shape or form, or combinations thereof. For example, ejectors 30 may form a cuboid, a pyramid, a tetrahedron, or may be cylinder-like or sphere-like, or otherwise form any arbitrary shape. FIGS. 8-13 provide exemplary embodiments of these and other forms of ejectors 30. With reference to FIG. 12, it is considered that each shape or ejector 30 may be partitioned, or associated with a neighboring shape or ejector 30 to operate as a single ejector 30. It is understood that surfaces and/or shapes may be merged, as exemplarily shown in FIG. 9, where the surfaces associated with leading and trailing sides 32, 34 merge with lateral side 36. Surfaces may be concave or convex, as exemplarily shown in FIGS. 9-10. Sides 32, 34, and/or 36 may extend perpendicularly relative to the groove bottom 24 or may extend radially at any desired bias, such that a surface thereof faces a direction outward groove 20, 21. This orientation may provide an ejection mechanism, as any ejecting contact that such surface may have with an object would direct the object outward from groove. This may also improve the wear, blistering, and tear properties of such ejectors 30.

Figure 6:
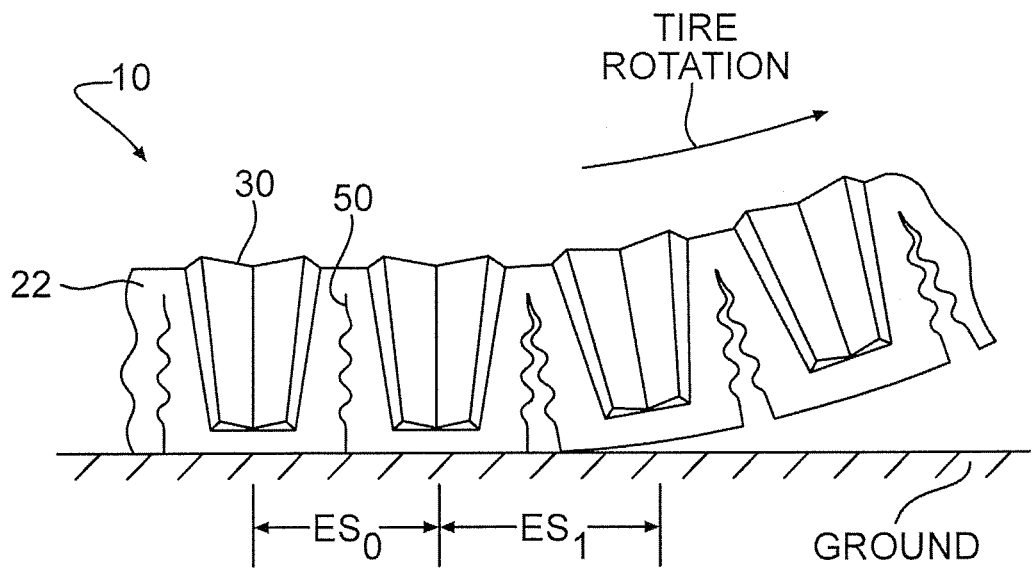
FIG. 6 is a side view of a groove sidewall of the exemplary tread pattern shown in FIG. 2, showing the tire tread exiting a tire footprint, in accordance with an embodiment of the invention.
Figure 7:
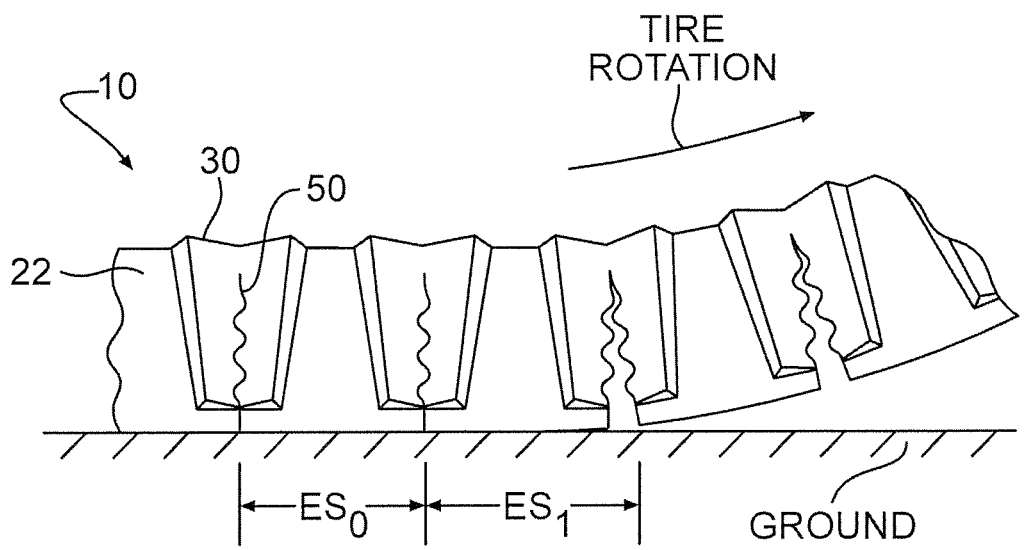
FIG. 7 is a side view of a groove sidewall of the exemplary tread pattern shown in FIG. 4, showing the tire tread exiting a tire footprint, in accordance with an embodiment of the invention.

In operation, a sipe 50 may generate object-ejecting movement along a groove sidewall 22 when entering or exiting a tire footprint. More specifically, sipe 50 may generate such movement by angularly or rotationally deflecting (i.e., opening) prior to entering, or subsequent to exiting, the tire footprint, which is exemplary shown in FIGS. 6-8. FIGS. 6-7 exemplarily show a sipe 50 generating movement along a groove sidewall as the tread exits a tire footprint. This movement may be described by the increase in sipe 50 spacing ES, as it moves from the footprint ($ES_0$) to the post-footprint (i.e., exiting) area ($ES_1$).

Figure 8:
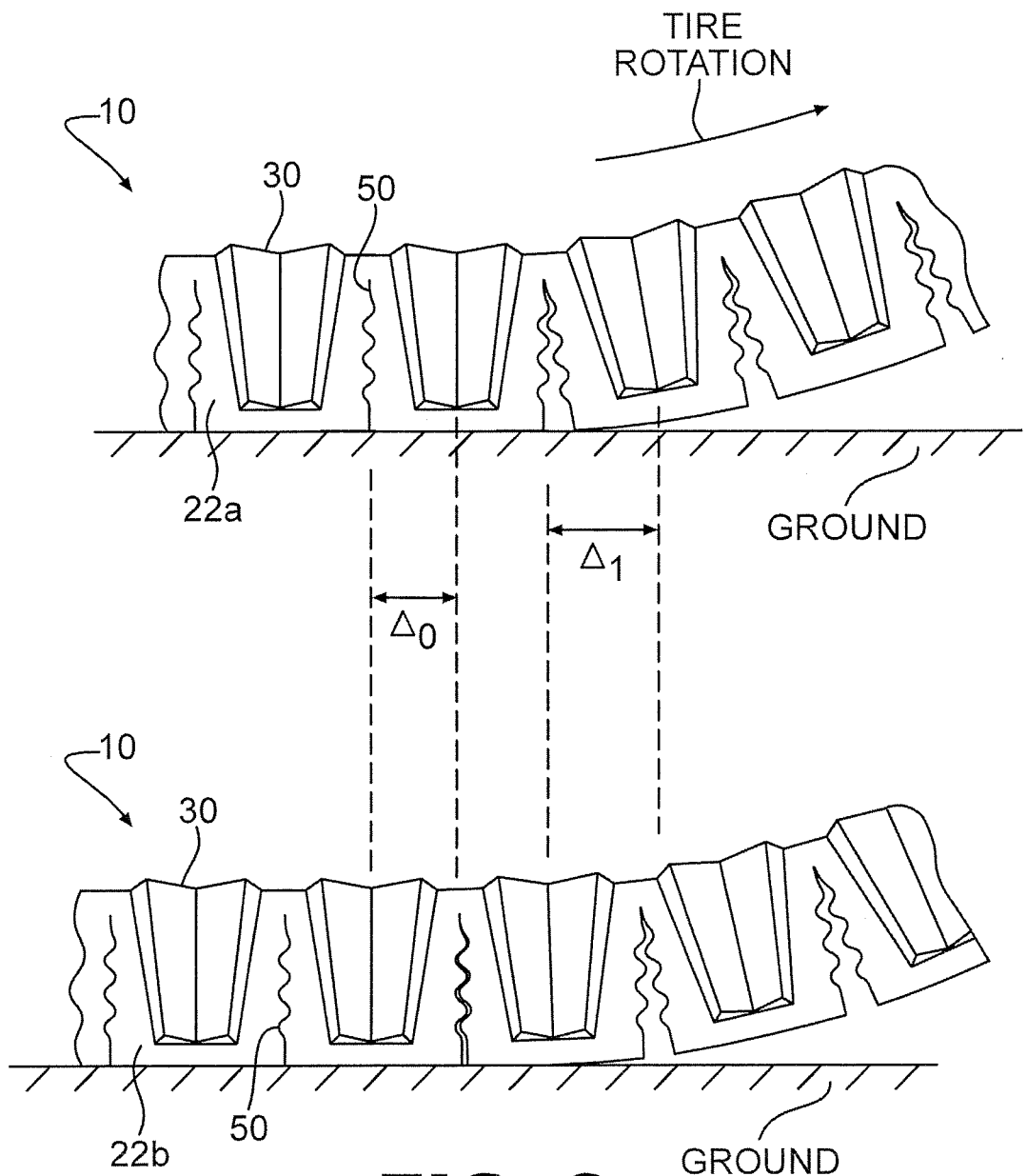
FIG. 8 includes related side views of each groove sidewall of the exemplary tread pattern shown in FIG. 2, the related side views showing the relative motion between each side as the tread exits the tire footprint, in accordance with an embodiment of the present invention.
Figure 9:
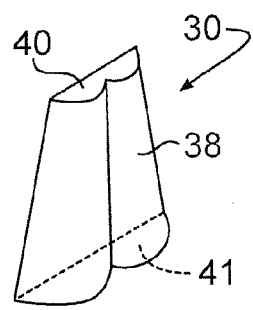
FIG. 9 is perspective view of an exemplary ejector, in accordance with an embodiment of the invention.
Figure 10:
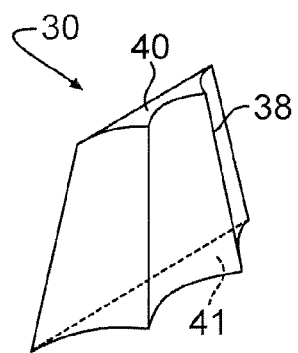
FIG. 10 is perspective view of an exemplary ejector, in accordance with an embodiment of the invention.
Figure 11:
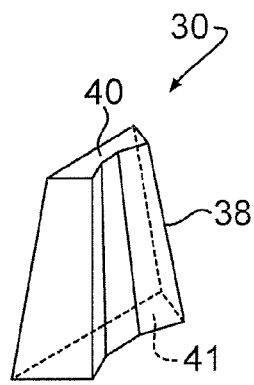
FIG. 11 is perspective view of an exemplary ejector, in accordance with an embodiment of the invention.

Movement generated along one groove sidewall 22 may be transformed into relative movement along the groove 20 between opposing groove sidewalls 22a, 22b. FIG. 8 exemplarily describes relative movement between opposing groove sidewalls 22a, 22b. Specifically, FIG. 8 uses the sipe-ejector arrangement of FIG. 6 to exemplify and describe relative movement along a groove 20, which is applicable to other sipe-ejector arrangements, including those described herein. In FIG. 8, $\Delta_0$ identifies the footprint spacing between a sipe 50 and an ejector 30 along sidewall 22a, which is relationally projected upon opposing sidewall 22b. Further, $\Delta_1$ references the same spacing upon exiting the tire footprint, in an area of increased angular deflection. It is apparent that $\Delta_1$ is greater than $\Delta_0$, which evidences a relative movement of the associated rib 12 or lug 14 along sidewall 22a. In particular, the associated ejector 30 moves along sidewall 22a in the direction of tire rotation as the associated sipe 50 opens. This movement also provides an increase in relative movement between sidewalls 22a and 22b, which becomes apparent when projecting the deflections $\Delta_0$ and $\Delta_1$ onto sidewall 22b. It follows that other sipe-ejector arrangements may provide relative movement between groove sidewalls 22a, 22b, provided such arrangement provides sipes that are not directly located opposite a sipe 50, or a similarly sized and shaped sipe 50.

To facilitate ejection of stones and other objects from tread 10, ejectors 30 operate in conjunction with one or more sipes 50 in various arrangements to generate an ejecting motion along groove 20 and/or 21. Along a groove 20, an ejector 30 is located relative to one or more associated sipes 50, each of which may extend from within ejector 30 as exemplary shown in FIGS. 4-5, and/or may be located adjacent to an ejector 30 as exemplarily shown in FIGS. 2-3. When a sipe 50 is located within an ejector 30, it is contemplated that such sipe 50 may be located anywhere along the length ($L_E$) of ejector 30, which may be centrally located as shown in FIGS. 4-5. In particular embodiments, an adjacent sipe 50 may be located along the groove sidewall 22 that contains the associated ejector 30, as exemplarily shown in FIGS. 2-3, where the associated sipe 50 may be located adjacent a leading or trailing side 32, 34 of the ejector 30. Embodiments may also provide an adjacent sipe 50 that is located across a groove 20 along an opposing groove sidewall 22, which is also exemplarily represented in FIGS. 2-3.

With regard to the first adjacent sipe-ejector arrangement discussed above, in which adjacently associated sipes and ejectors are contained along a single sidewall 22 (the "co-existing sipe-ejector sidewall arrangement"), the sipes 50 may be located any distance from a side 32, 34 of ejector 30. Deflection of ejector 30 may increase when the associated sipe 50 is more closely located to a side 32, 34. In one embodiment, a sipe 50 is located a zero distance from a side 32, 34. In another embodiment, a sipe 50 is located approximately 1 mm from a side 32, 34. In yet another embodiment, an ejector 30 has a length of 7 millimeters (mm), and the adjacently associated sipe 50 is located 1.5 mm from a side 32, 34, which approximately provides a 1:5 ratio in associating sipe offset to ejector length. In other embodiments, a sipe 50 is adjacently located on each side 32, 34 of ejector 30, as shown in FIGS. 2-3, which may provide increased deflection over a single sipe arrangement. Accordingly, when providing multiple ejectors 30 along a sidewall 22, where each ejector 30 has sipes 50 adjacently located on each side 32, 34, as exemplarily shown in FIGS. 2-3, each ejector 30 may have associated one or more sipes 50 that (1) are not associated or shared with an adjacent ejector 30 (i.e., each ejector 30 has one or more independently associated sipes 50), and/or (2) are shared with an adjacent ejector 30, where each such sipe 50 is located between the adjacent ejectors 30 as exemplarily shown in FIGS. 2-3. Ejecting capabilities may also increase when including the co-existing sipe-ejector sidewall arrangement on both sidewalls 22a, 22b, which may be arranged in staggered relation as represented in FIGS. 2-3. Such staggered arrangement may include a standard spacing or a non-standard spacing, such as when attempting to reduce any noise generated by the tread during tire operation.

In the second adjacently associated sipe-ejector arrangement discussed above, which provides a sipe 50 adjacently located along a sidewall 22 opposite an ejector 30 (the "opposing sidewall sipe-ejector arrangement"). In this embodiment, one or more sipes 50 may be located directly opposite a portion of an ejector 30 in the tread lateral direction ($D_L$), or any distance there from even though with increasing distance the sipe-ejector association may become less effective in generating object-ejecting movement. This sipe-ejector arrangement may be repeated along a groove 20 in a staggered relation (i.e., all ejectors are located along a single sidewall 22). This sipe-ejector arrangement may also be repeated in an alternating staggered relation (i.e., ejectors and sipes of different sipe-ejector arrangements are located on the same sidewall 22), which is represented in FIGS. 2-3.

When facilitating ejection motion with any associated sipe 50 and ejector 30 arrangement discussed above, it is contemplated that each sipe 50 vertically overlap the associated ejector. In other words, the heights of an ejector 30 and an associated sipe 50 are overlapped when portions of both extend through a single transverse plane, where the plane extends both in the lateral ($D_L$) and longitudinal ($D_C$) directions. This overlap is identified as (Ov) in FIGS. 3, 5, 14, and 15. It is contemplated that any overlap is useful in generating ejecting motion, although effectiveness generally increases with increasing overlap (Ov). In one embodiment, 50% of an ejector 30 is overlapped by an associated sipe 50. In another embodiment, 100% of the ejector 30 is overlapped, as shown exemplarily in FIG. 15. FIGS. 3, 5, and 14 show an overlap of less than 100% but greater than 50%.

In the arrangement discussed above, it is contemplated that each sipe 50 may not be located opposite another sipe 50 along groove 20 to generally provide relative motion, or shearing, between opposing groove sidewalls 22a, 22b. Therefore, it may be desirous to maintain any opposing sipes 50 in a spaced apart or staggered arrangement. However, it is contemplated that ejecting motion may be provided when a sipe 50 opposes another sipe 50 if the opposing sipes 50 are different in size and/or shape or provide a different overlap (Ov) with its associated ejector 30. This may still facilitate ejection motion as the different sipes 50 may provide different deflections or movement between opposing groove sidewalls 22a, 22b.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A tire tread having a length extending in a longitudinal direction, a width extending in a lateral direction, and a depth extending in a vertical direction, the tire tread comprising:
    a pair of adjacent ground-engaging elements, each element including a ground-engaging contact surface;
    a groove separating the pair of ground-engaging elements, the groove having a groove bottom and a pair of opposing sidewalls spaced apart by a groove width, the groove having a length and a groove depth extending perpendicular to the groove length from the ground-engaging contact surface to the groove bottom;
    a plurality of sipes arranged along the groove length, each sipe having a particular size, and located in communication with a portion of the groove extending between the pair of ground-engaging elements, said plurality of sipes including a first arrangement of sipes spaced along one of the pair of opposing sidewalls, and a second arrangement of sipes spaced along the other of the pair of opposing sidewalls;
    a plurality ejectors spaced along the groove length, each ejector having a top side, a bottom side and a height extending from the top side to an ejector bottom side, the ejector comprising a projection that extends into the groove from one of the groove sidewalls,
    wherein each ejector includes two ridges protruding from the lateral side and extending into the groove and in a direction of the groove depth, the two ridges being spaced apart in the direction of the groove length to form a recessed portion between the two ridges;
    wherein the first arrangement of sipes is staggered relative to the second arrangement of sipes in a direction of the groove length;
    said plurality of ejectors and said plurality of sipes being configured to provide relative movement between the pair of opposing sidewalls for ejecting objects from the tire tread, wherein said each of the plurality of sipes extends downwardly from the ground-engaging contact surface of a ground-engaging element at least partially past the top surface of each of said plurality of ejectors and extends substantially across the width of a ground-engaging element.

2. The tire tread as recited in claim 1, wherein each of the plurality of sipes is located within one of the plurality of the ejectors.

3. The tire tread as recited in claim 2, wherein each of the plurality of sipes extends completely across the width of said ground-engaging element.

4. The tire tread as recited in claim 2, where each of the plurality ejectors forms a narrowed portion of the groove width.

5. The tire tread as recited in claim 1, wherein each of the plurality of sipes is located along one of the sidewalls adjacent one of the plurality of ejectors.

6. The tire tread as recited in claim 5, wherein the ejector bottom side is offset from the groove bottom and each of the plurality of sipes extends completely downwardly past said ejector bottom side within the groove.

7. The tire tread as recited in claim 5, wherein each of the plurality of sipes located on one of the pair of sidewalls is located opposite one of the plurality of ejectors arranged on the other of the pair of sidewalls across the width of the groove.

8. The tire tread as recited in claim 5, where each of the plurality ejectors forms a narrowed portion of the groove width.

9. The tire tread as recited in claim 1, wherein each ejector includes a cross-section and a height extending away from the groove bottom, where the cross-section narrows as the ejector extends from a portion closest to the groove bottom.

10. The tire tread as recited in claim 1, wherein each ground-engaging element of the pair of elements is a rib or a lug.

11. The tire tread as recited in claim 1, wherein each of the plurality of sipes has a height such that the height of each of the plurality of sipes and the height of each of the plurality of ejectors extends through a transverse plane extending the lateral and longitudinal directions of the tread.

12. The tire tread as recited in claim 1, each ejector having a height defined as the distance between the top side of the ejector and an ejector bottom side, wherein the ejector bottom side is offset from the groove bottom.

13. The tire tread as recited in claim 1, wherein one or more of the plurality of the ejectors is associated with two or more of the plurality of sipes.

14. The tire tread as recited in claim 1, where each of the plurality ejectors forms a narrowed portion of the groove width.

15. The tire tread as recited in claim 1, where each of the plurality of sipes are arranged within one of the plurality of ejectors between the pair of ridges.

* * * * *